Figure 1:
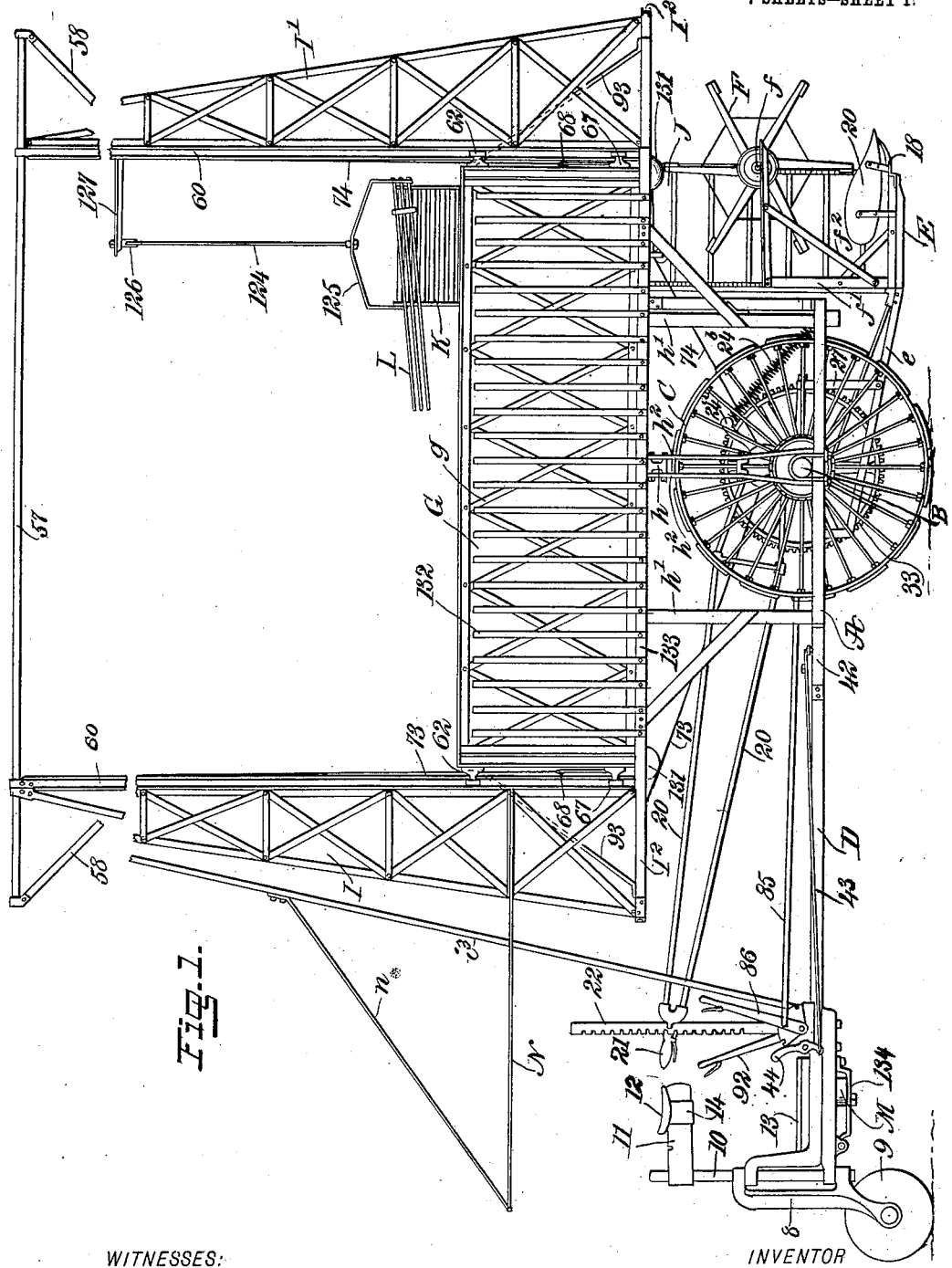

No. 754,780. PATENTED MAR. 15, 1904.
J. H. KINDSVATER.
COMBINED HEADER AND STACKER.
APPLICATION FILED OCT. 4, 1902.
NO MODEL. 7 SHEETS—SHEET 1.

WITNESSES:
James F. Dechamel
W. J. Benchard

INVENTOR
John H. Kindsvater
BY Munn & Co.
ATTORNEYS.

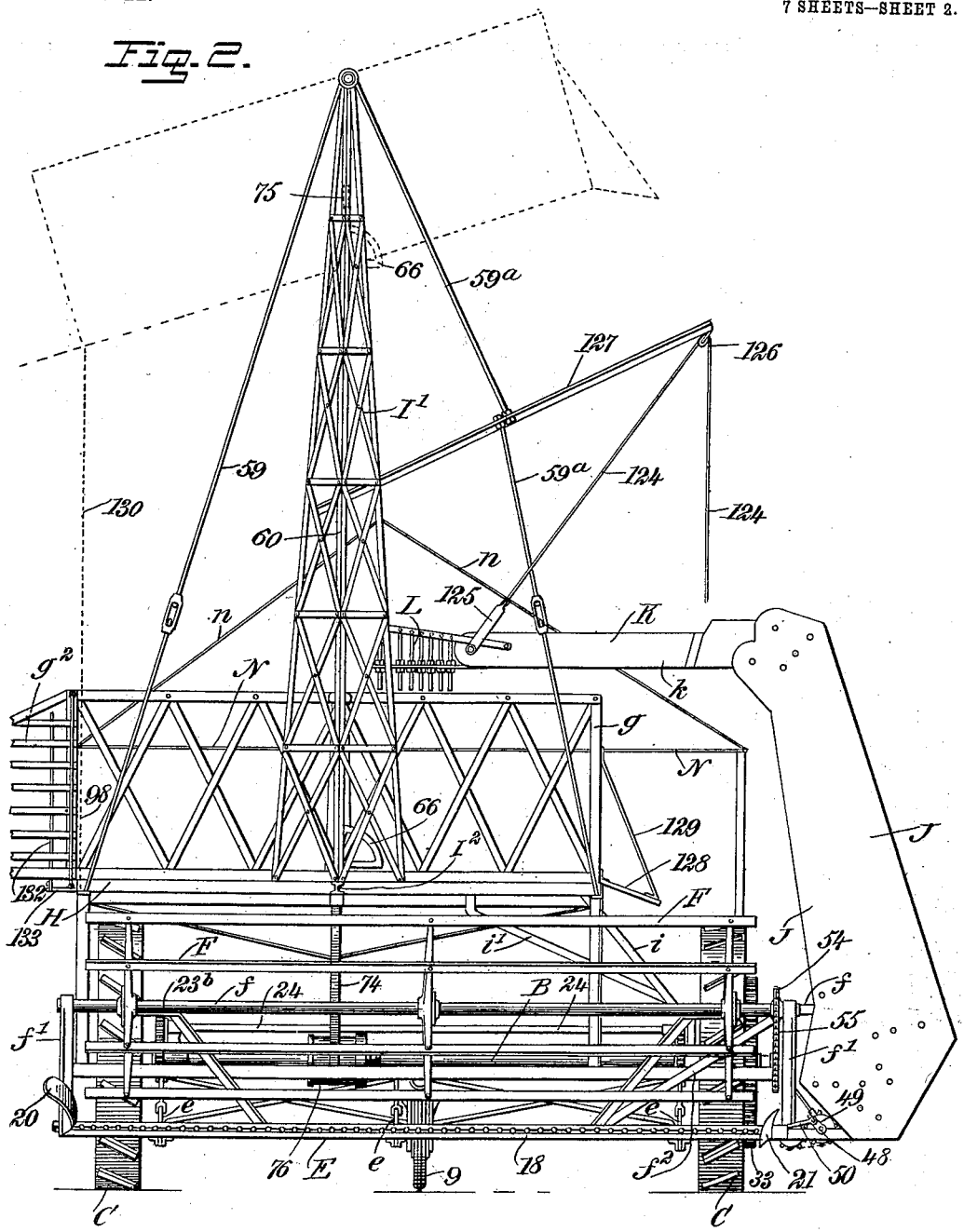

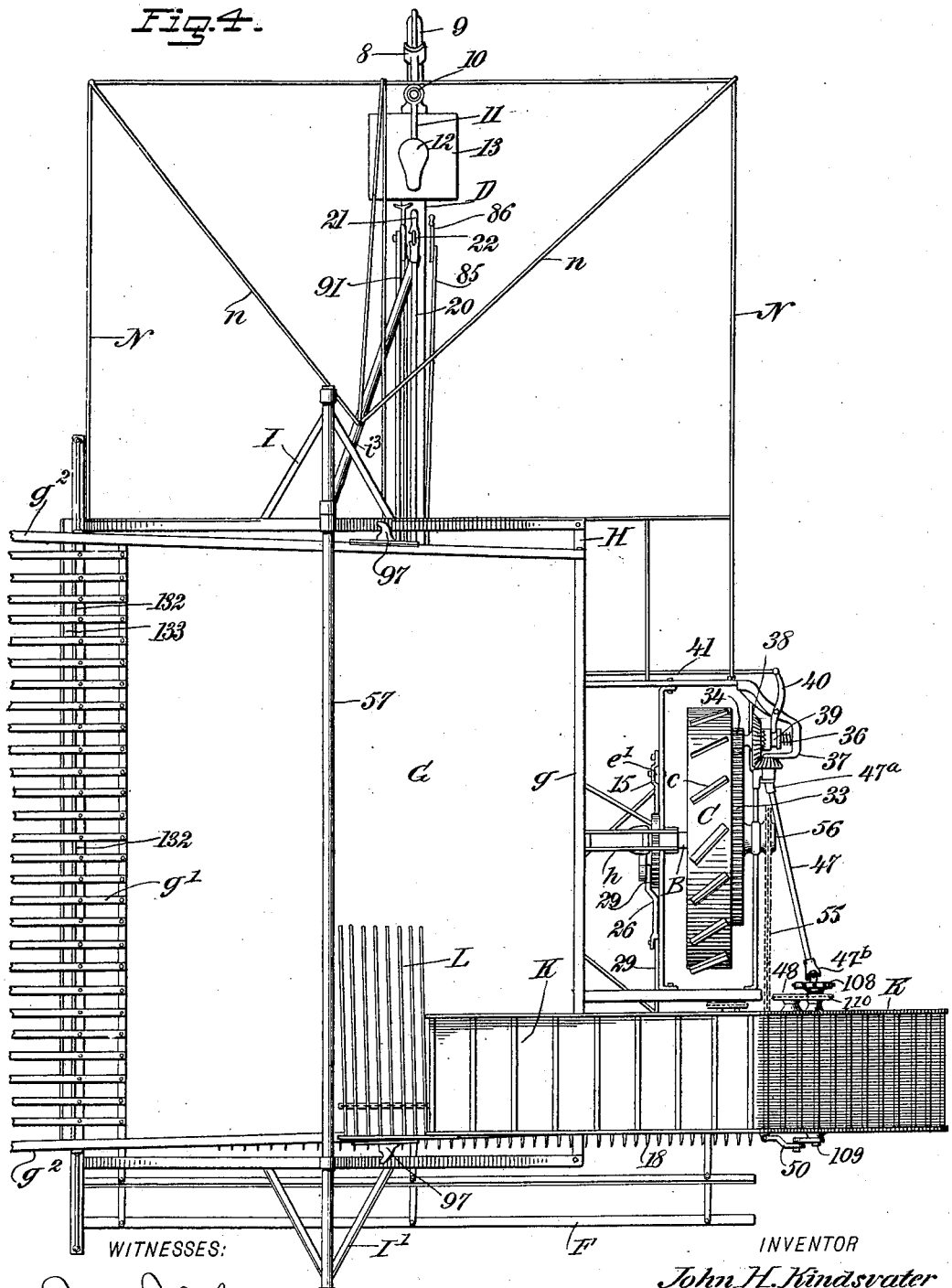

No. 754,780. PATENTED MAR. 15, 1904.
J. H. KINDSVATER.
COMBINED HEADER AND STACKER.
APPLICATION FILED OCT. 4, 1902.
NO MODEL. 7 SHEETS—SHEET 4.

WITNESSES:
James F. Duhamel
N. F. Bernhard

INVENTOR
John H. Kindsvater
BY Munn
ATTORNEYS.

THE NORRIS PETERS CO., PHOTO-LITHO., WASHINGTON, D. C.

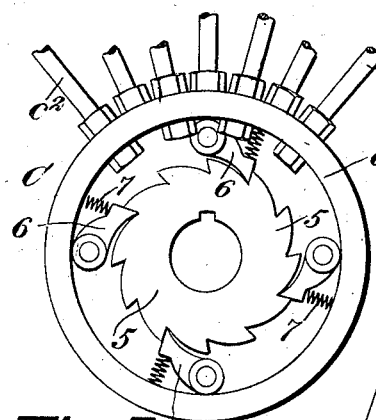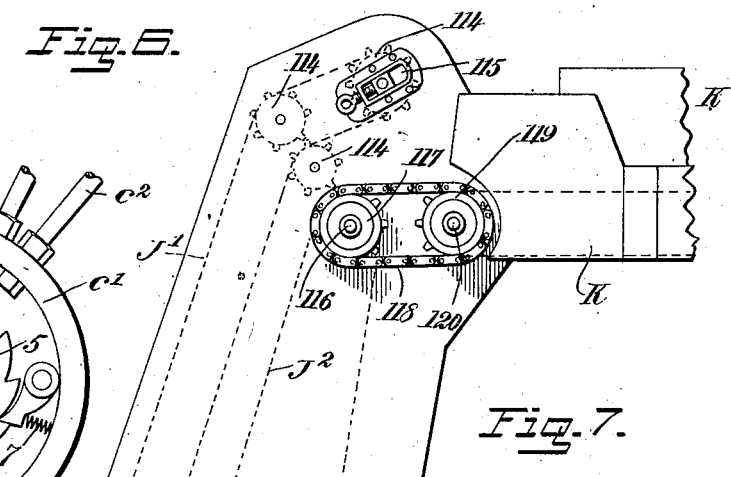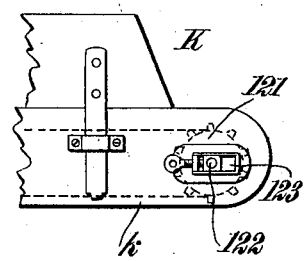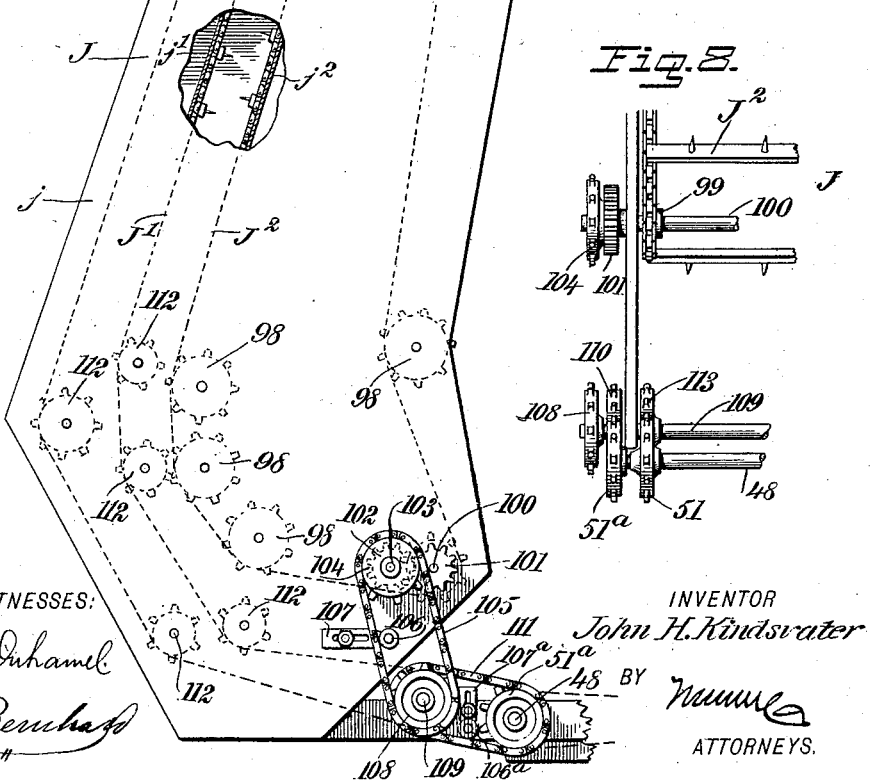

No. 754,780. PATENTED MAR. 15, 1904.
J. H. KINDSVATER.
COMBINED HEADER AND STACKER.
APPLICATION FILED OCT. 4, 1902.
NO MODEL. 7 SHEETS—SHEET 6.
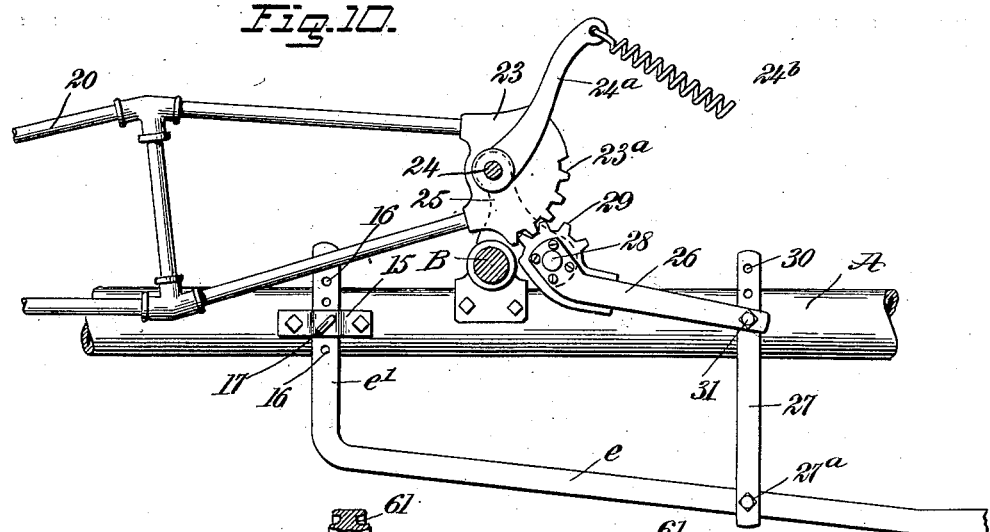
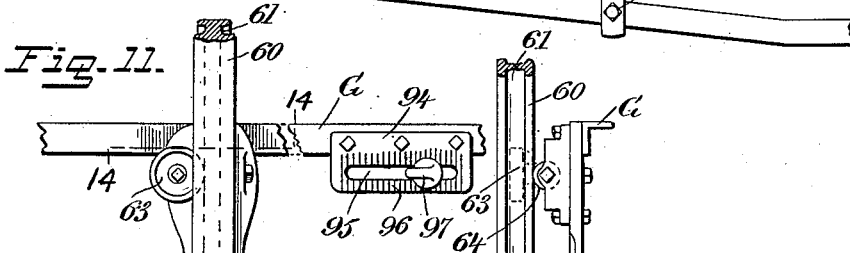
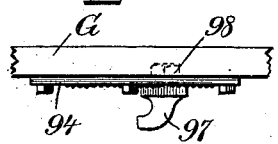
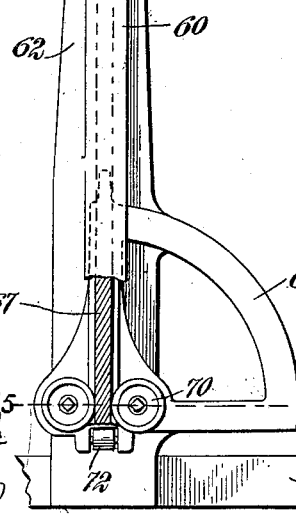
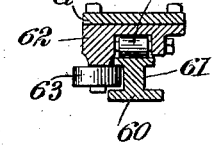
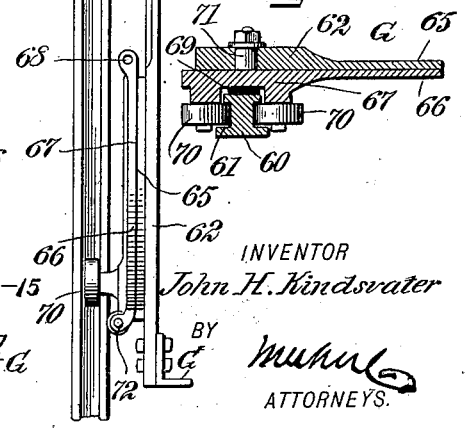
WITNESSES:
James P. Duhamel
W. H. Bernhard
INVENTOR
John H. Kindsvater
BY
muhul
ATTORNEYS.
THE NORRIS PETERS CO., PHOTO-LITHO., WASHINGTON, D. C.

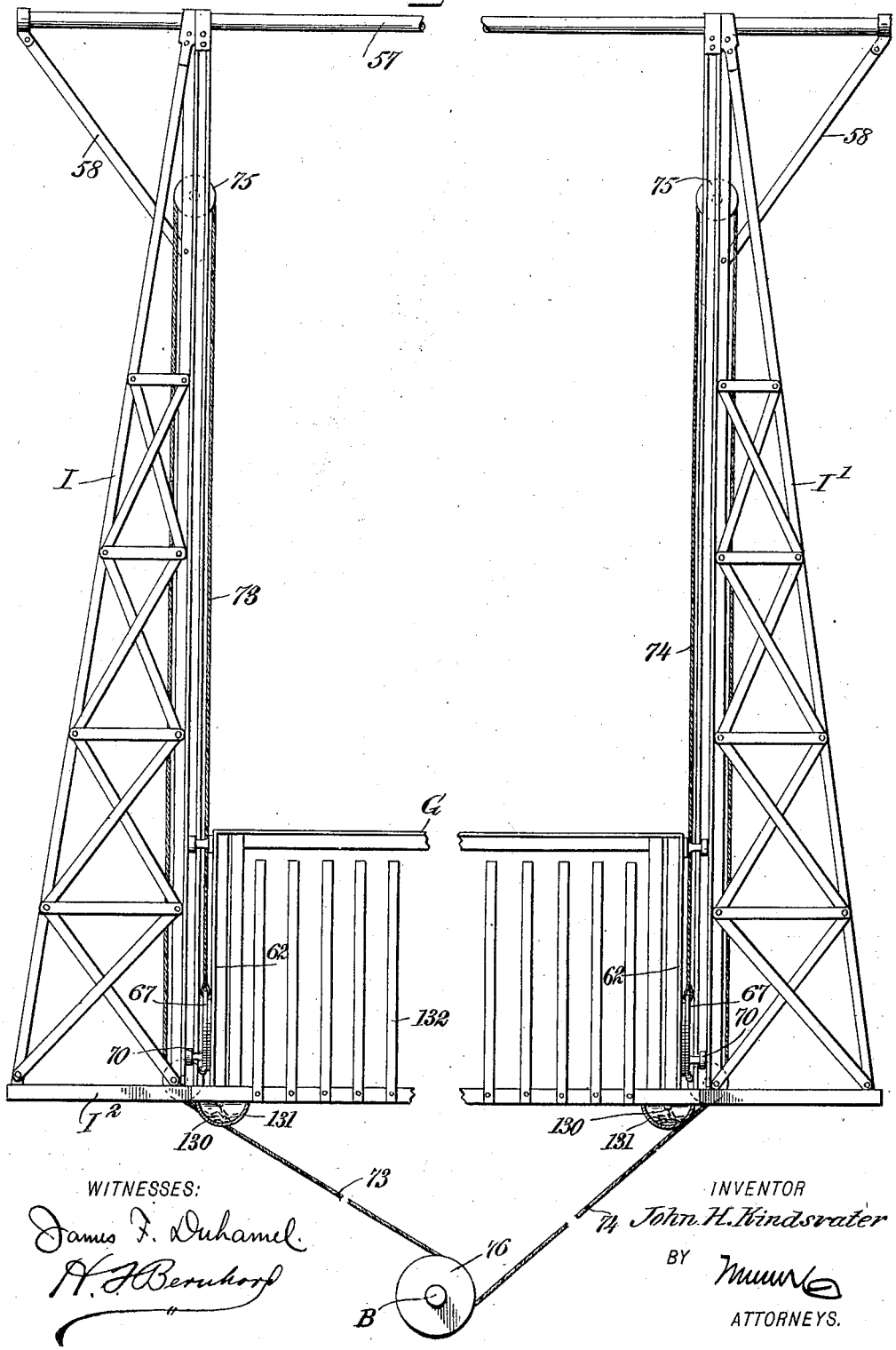

No. 754,780. Patented March 15, 1904.

UNITED STATES PATENT OFFICE.

JOHN H. KINDSVATER, OF MANHATTAN, KANSAS.

COMBINED HEADER AND STACKER.

SPECIFICATION forming part of Letters Patent No. 754,780, dated March 15, 1904.

Application filed October 4, 1902. Serial No. 125,948. (No model.)

*To all whom it may concern:*

Be it known that I, JOHN H. KINDSVATER, a citizen of the United States, and a resident of Manhattan, in the county of Riley and State of Kansas, have invented new and useful Improvements in a Combined Header and Stacker, of which the following is a full, clear, and exact description.

My invention relates to improvements in harvesting machinery of that class for cutting the heads of grain; and the present invention is directed to a machine for heading and stacking the grain.

In the operation of heading grain as ordinarily practiced it is customary to use a header to harvest the grain and to deliver the latter into vehicles or "barges" which are driven alongside the header until loaded, and these loaded vehicles are then hauled to a stack, after which the grain is discharged by pitching it on the stack. This involves considerable labor, time, and expense, because it requires a gang of five (5) to seven (7) men, eight (8) or ten (10) horses, a heading-machine, and two (2) or three (3) wagons.

I aim to reduce the time, expense, and labor by the provision of a machine which will harvest the grain and can be driven in a loaded condition alongside of the stack, upon which the load is discharged directly from the machine, so as to dispense in a large measure with the services of the men. It is estimated that a team of horses, about eight (8) in number, and a gang of three (3) men will be all that are required to harvest and stack the grain, and these operations can be performed more expeditiously and with less labor, thus saving time, which is an item of no small importance during the harvest season. In the service of my machine the grain does not require pitching, because it is handled by a machine in a manner which minimizes its exposure to the wind, thus largely avoiding the objection of "blowing" the grain by the wind. The mechanical stacking of the harvested grain enables me to build or erect the stack more firmly and solidly, because the grain is discharged largely in the center of the stack and not upon the sides thereof, so that the core or center of the stack is quite compact and solid. A stack built in this way does not expose the grain to the wind and weather so much as an ordinary stack on which the grain is pitched by hand, and the grain will also better withstand the effects of the weather.

My invention contemplates the organization in a single machine of a cutter apparatus, a conveyer in operative relation thereto, an elevator, a vertically-movable receiver or barge arranged to be loaded with grain from the elevator, and means for hoisting and dumping the barge.

The machine is equipped with means for adjusting the cutter apparatus and for throwing it into and out of gear, with power devices for bodily elevating the receiver or barge by the movement of the portable apparatus, with means for tilting the raised barge, for guiding the same during its tilting movement, and for braking the descent of the barge after it shall have been unloaded, and with a horizontal conveyer, which is shiftable relatively to the barge, so that it may be moved out of the way previous to the elevation of the barge.

Reference is to be had to the accompanying drawings, forming a part of this specification, in which similar characters of reference indicate corresponding parts in all the figures.

Figure 5:
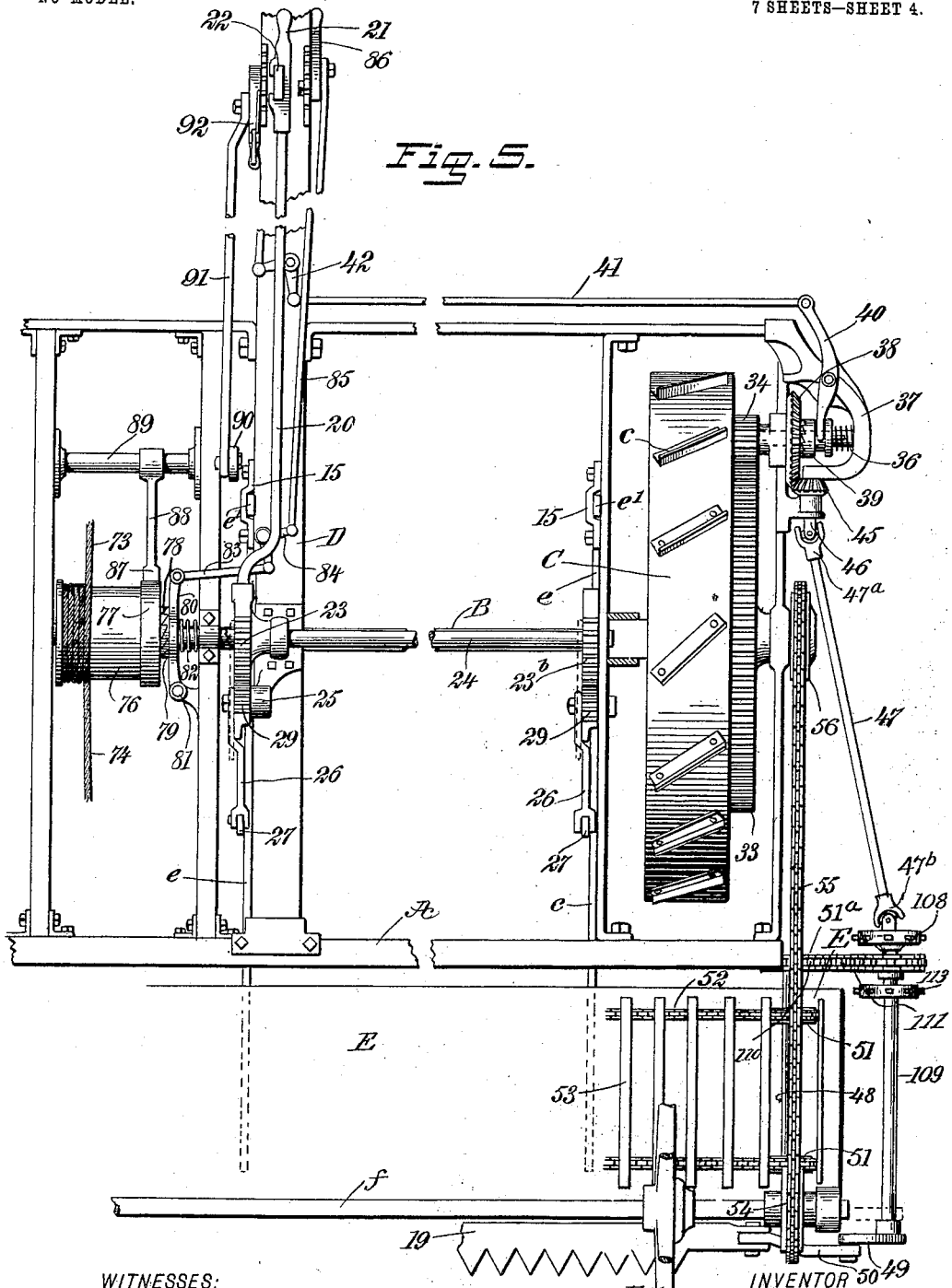

Figure 1 is a side elevation of a combined header and stacker constructed in accordance with my invention. Fig. 2 is an elevation looking at the front end of the machine. Fig. 3 is a fragmental detail view of one of the side wings at the delivery end of the tiltable and vertically-movable receiver or barge. Fig. 4 is a plan view of the machine, omitting certain parts. Fig. 5 is an enlarged plan view with certain parts broken away, showing a portion of the main frame, the cutter-platform, and various devices for driving and operating certain of the mechanisms. Fig. 6 is an enlarged view, in side elevation, of the preferred form of the elevator which is employed between the lower conveyer that lies adjacent to the cutter apparatus and an upper horizontal conveyer adapted to discharge the grain into the receiving-barge. Fig. 7 is a detail view of the free end portion of the upper horizontal conveyer, illustrating the take-up device for said conveyer. Fig. 8 is a detail view in elevation of the means for driving the endless elevators, said view looking at the lower right-hand portion of Fig. 6. Fig. 9 is a detail view of a portion of one drive-wheel and the ratchet-clutch within the hub of said drive-wheel. Fig. 10 is an enlarged view of a portion of the means for adjusting the cutter-carrying platform. Fig. 11 is a sectional elevation of a portion of the means for directing the vertical and tilting movement of the elevating barge or receiver. Fig. 12 is an elevation at right angles to Fig. 11 of the same parts. Fig. 13 is a detail plan view of one of the adjustable stops employed in connection with the tiltable barge or receiver to limit the oscillation thereof. Figs. 14 and 15 are detail cross-sectional views of the upper and lower parts of the devices shown by Fig. 11, and Fig. 16 is a diagrammatic view illustrating more particularly the arrangement of the parts comprising the mechanism for hoisting the receiver or barge.

The main frame of the machine is indicated at A, and it consists of a suitable number of metallic bars or beams which are united together firmly, so as to produce a substantial construction adapted to sustain the weight of the various parts. This frame is provided with suitable axle-bearings for the accommodation of a horizontal main axle B. (Indicated in Figs. 1, 2, and 5 of the drawings.) Said axle B is equipped with carrying-wheels C, two or more in number, and preferably arranged at the end portions thereof. These wheels are adapted to drive the axle from which the power is taken for operating the several parts of the machine, and these main or drive wheels may be of any suitable or preferred construction, each wheel having a broad tread provided with suitable teeth $c$, adapted to prevent slipping in the ground. As shown more clearly by Fig. 6, each wheel is provided with an enlarged chambered hub $c'$, to which are fastened suitable radial spokes $c^2$, and this hub is loosely mounted on the main axle B, so as to turn freely in one direction thereon. Within the chambered hub $c'$ of each main or drive wheel is arranged a ratchet 5, that is keyed or otherwise made fast with an end portion of the main axle B, and this ratchet is engaged by a series of pawls 6, which are pivotally hung to and within the hub in position for engagement with the ratchet 5, each pawl being pressed toward the ratchet by a coiled spring 7, (see Fig. 9,) whereby the pawl-and-ratchet mechanism makes the drive-wheel fast with the axle on the forward movement of the machine, so as to rotate the axle; but when the machine is backed the pawls slip idly around the ratchet, and the main axle remains at rest.

A tongue or draft-pole D of substantial construction is united to the middle portion of the main frame A to extend rearwardly a suitable distance therefrom, and at the rear end of this tongue is mounted a vertical hanger 8, which is swiveled to turn freely on a vertical axis. This hanger is equipped with a tiller-wheel 9, adapted to control the course of the machine, and said hanger and tiller-wheel are shifted by the manipulation of a spindle 10, the latter being provided with a forwardly-extending arm 11, adapted to carry a suitable seat 12, on which the driver may sit, if desired. The rear end of the tongue which is supported by the tiller-wheel is equipped with a standing platform 13 for the accommodation of the driver. If desired, the seat 12 may be provided with a clip or sleeve 14, adapted to slidably fit on the arm 11 of the steering-spindle, and the employment of this clip enables the seat 12 to be shoved out of the way of the driver when he is standing on the platform 13. (See Fig. 1.) The entire machine is supported by the main drive-wheels C on the main axle B and by the tiller-wheel 9, which is shiftable to different horizontal positions and mounted at the rear end of the draft-beam or tongue D.

Across the front end of the machine is arranged a horizontal cutter apparatus of any suitable type, and over this cutter apparatus is disposed a rotary horizontal reel, the latter adapted to sweep the grain rearwardly toward the cutter apparatus in order to secure efficiency in the operation of this part of the machine. The cutter apparatus is shown in the preferred embodiment of the invention as mounted on a vertically-adjustable swinging platform E, a part of which is indicated by Figs. 1 and 2. This platform normally occupies a horizontal position close down to the ground and in advance of the main drive-wheels C, and said platform is equipped or constructed with the rearwardly-extending arms $e$. (See Figs. 1 and 10.) A suitable number of the arms $e$ may be provided to properly support the cutter-carrying platform, and these arms extend rearwardly beneath the front portion of the main frame A, each arm being provided with an upwardly-extending shank $e'$. The shanks of the series of arms are fitted for vertical adjustment in brackets 15, which are secured to certain parts of the frame A, and the shank $e'$ of each carrying-arm $e$ is provided with a series of transverse apertures 16, the brackets 15 supporting the pivotal bolts or pins 17, each pin passing through one bracket 15 and fitting in one of the series of apertures 16 in the shank $e'$. From this description it will be understood that the shanks of the bars which carry the cutter-platform are pivoted individually in certain brackets on the frame A, and these perforated shanks are adapted for vertical adjustment in the brackets 15, said adjustment being effected by withdrawing the pins or bolts 17, adjusting the shanks of the carrying-arms up and down within the brackets, and finally replacing the pins or bolts 17.

In the drawings I have shown the cutter apparatus arranged at the front edge of the horizontal platform E, and this cutter apparatus consists of a suitable finger-bar 18 and a reciprocatory sickle 19 and suitable guides 20 21, which are mounted on the platform E at opposite ends of the cutter apparatus; but I would have it understood that I do not confine myself to the employment of any style of cutter apparatus.

I have provided means for easily and quickly adjusting the platform and cutter apparatus vertically, and the preferred embodiment of said adjusting means will now be described, reference being had more particularly to Figs. 1, 5, and 10 of the drawings.

20 designates a trussed lever arranged in a substantially horizontal position and extending longitudinally of the machine-frame from front to rear thereof. This lever is provided at its rear portion with a hand-grip 21, disposed within convenient reach of the operator on the platform 13 and arranged to slidably fit on an upright rack-bar 22, which is supported on the tongue or pole D, said rack-bar being provided with notches or teeth adapted for engagement by a latch, which is carried on the hand-grip 21 in a well-known way. The front portion of the trussed lever 20 is provided with a casting forming a head 23, the same being provided with a series of teeth $23^a$, constituting the toothed segment. This lever 20 is fulcrumed on and rigidly fastened to a horizontal rock-shaft 24 by rigidly attaching the toothed head or segment 23 to said shaft, the latter being journaled in suitable standards 25, (indicated by dotted lines in Fig. 10,) said standards being rigidly fastened to certain bars of the main frame A and extending upwardly therefrom. The rock-shaft 24 extends across the machine-frame above and parallel to the main axle B, and this rock-shaft is free to turn in its bearings when the lever 20 is raised or lowered. The rock-shaft is provided with toothed segments $23^b$ near its end portions, said segments being similar to the segmental toothed head 23 at the front end of the trussed lever, and the series of segments 23 $23^b$ are properly spaced apart on the rock-shaft, so as to have operative engagement with a series of levers 26, which are linked at 27 to the pivoted arms e, which carry the cutter-platform E. I prefer to arrange the head 23 of the trussed lever on the middle portion of the rock-shaft 24, while the toothed segments $23^b$ are fastened to the rock-shaft near the end portions thereof, one of said segments $23^b$ being indicated by Fig. 5.

The series of levers 26 are hung or fulcrumed individually on certain bars of the main frame A, each lever being hung at 28 on one frame-bar by any suitable means. The short end of each lever 26 is provided with a toothed segment 29, arranged to mesh directly with one of the series of toothed segments 23 $23^b$ on the rock-shaft, whereby the movement of the lever 20 in one direction will actuate the series of segments through the rock-shaft, and these segments will in turn change the positions of the series of levers 26. Each link 27 is disposed in a vertical position to overlap its lever 26 and one of the carrying-arms e, and the lower end of this link is pivoted, as at $27^a$, to the arm e, while the upper portion of the link is provided with a series of apertures 30, through one of which passes a shiftable pivotal bolt 31, adapted to shiftably and pivotally connect each lever 26 with its companion link 27.

The rock-shaft 24 is provided with an upwardly-extending arm $24^a$, to which is attached one end of a coiled spring $24^b$, the latter having its other end fastened to the frame. This spring and arm normally tends to turn the rock-shaft in one direction and assist the operator in moving the trussed lever 20, thus reducing the amount of effort required on the part of the operator to raise the cutter-carrying platform.

By depressing the free end of the trussed lever 20 the rock-shaft is turned and the levers 26 are moved to lower the links 27, and thereby lower the platform and the cutter apparatus; but by raising the free end of this lever 20 the rock-shaft is rotated and the levers 26 are raised, so as to make the links pull upwardly on the arms e, and thereby elevate the platform and the cutter apparatus.

I will now proceed to describe the means for driving the cutter apparatus, reference being had more particularly to Figs. 4 and 5 of the drawings. On the main axle B is rigidly secured a master-gear 33, with which meshes the gear-pinion 34, which is fast with a shaft 36. This shaft is arranged in a horizontal position at one end of the main frame A and is partly supported by said frame and by a bracket 37, which is fixed to the frame, and loosely mounted on this shaft 36 is a large bevel-gear 38, the latter being provided on one face or side with a clutch-section. With this clutch-section is arranged to engage a shiftable clutch-section 39, that is keyed on the horizontal shaft 36, so as to slide and turn thereon, and with the clutch-section 39 is loosely engaged a shipper-lever 40, the latter being fulcrumed on a bracket 37 and having its upper end pivoted to a beam 41, the latter being pivoted to a bell-crank lever 42. Said lever is fulcrumed on the tongue or pole D, and to its other arm is pivoted a link 43, the latter being connected to the lower end of a treadle-lever 44, as shown by Fig. 1, whereby the movement of this treadle in one direction will actuate the levers 42 and 40, so as to withdraw the clutch member 39 and allow the gear 38 to turn idly on the shaft 36. This gear 38 is adapted to mesh with a bevel-pinion 45, which is secured to a short shaft 46, that lies at right angles to the shaft 36, and is journaled in a suitable bearing on the bracket 37. A tumbling-shaft 47 is connected by a universal joint 47ª with the short shaft 46, and the other end of said tumbling-shaft is connected by another universal joint 47ᵇ to a horizontal driving-shaft 109, the latter being journaled in suitable bearings at one end of the cutter-platform E. This driving-shaft 109 is provided at one end with a crank-disk 49, to which is pivoted a pitman 50, having operative connection with one end of the sickle-bar 19, which forms a part of the cutter apparatus. The described means provides for the transmission of power from the master-gear 33 to the shaft 109 for the operation of the cutter apparatus, and the employment of the tumbling-shaft 47 between the shafts 46 and 109 allows the desired adjustment of the cutter apparatus with the platform E without interfering with the train of operative connections from the shaft 109 and the driving mechanism for said cutter apparatus. The upper end of the shaft 47 is square to fit slidably in a square hole provided in the joint 47ª, which is long enough to permit a limited movement of the shaft 47 without dropping out of the joint when the platform is lowered, thus allowing the shaft 47 to adjust itself relative to the train of gearing on adjustment of the platform and cutter apparatus.

The shaft 48 has a gear 51ª, driven by a chain 111 from the sprocket 110 on the shaft 109, and said shaft 48 is also provided with sprocket-gears 51, with which are engaged sprocket-chains 52, which carry a series of toothed slats 53, (see Fig. 5,) said chains and the series of slats extending longitudinally across the platform E. These slatted chains are operatively arranged to traverse the platform in a way to form a horizontal conveyer mechanism, which is arranged directly in rear of the cutter apparatus, and this cutter apparatus and the platform conveyer are driven from the shaft 109 and controlled by the clutch mechanism, so as to be started and stopped at will.

The reel is indicated in its entirety at F, the same having a horizontal shaft $f$, which is journaled in a suitable framework attached to the cutter-carrying platform E. This reel is arranged in a horizontal position above the cutter apparatus, so as to work in advance of the latter, and said reel may be of any suitable construction known to the art. Any suitable style of reel-supporting frame may be adopted; but I have shown a part of this frame at $f'$ in Fig. 1, said frame having a diagonal brace $f^2$. The reel-shaft $f$ is provided at one end with a sprocket-gear 54, with which engages a sprocket-chain 55, that is driven from a sprocket-pinion 56 on one end of the main shaft or axle B, whereby the reel is driven by an independent train of gearing from the main axle.

One of the important elements of my improved machine resides in a vertically-movable and tiltable receiver or barge, the same being indicated in its entirety at G. This receiver or barge is arranged in a horizontal position over the main frame and the cutter apparatus, and this barge in its lowered position is adapted to rest on a suitable floor H. This floor is preferably of metallic construction, comprising suitable beams or angle-bars, and the floor is skeletonized in order to reduce the weight. The floor primarily comprises I-beams $h$, joined substantially together and strengthened by diagonal braces, and this floor in its entirety is supported in a fixed horizontal position above the main frame and the drive-wheels by a series of strong metallic posts $h'$, said posts being firmly bolted to the frame A and to the elevated floor H. On this horizontal elevated floor is erected the vertical towers I I', the same being situated on opposite sides of the floor, at the middle thereof, and arranged in alinement with each other transversely across the machine. The main support for the two towers resides in a strong metallic I-beam I², (see Fig. 1,) and this I-beam may be braced to the main frame in a suitable way, while the horizontal elevated floor is stayed to the main frame by suitable braces, one of which is indicated at $i'$ in Fig. 2.

The receiver G is of metallic construction, comprising a skeleton framework and a sheet-metal lining; but for the sake of clearness in illustrating certain parts of the machine the lining is omitted. The receiver is arranged to fit between the towers I I', and said receiver is arranged so that its transverse axis is out of line with the median line of the towers, thus disposing said barge into eccentric relation to said towers. One end of the receiver is closed, as indicated at $g$; but the other end of said receiver is open in order that the load of grain may be discharged therefrom when the barge is tilted. The open end of the barge is provided with a series of fingers or slats $g'$, which are disposed in line with the floor of the barge and are firmly secured thereto in any appropriate way, these fingers or slats constituting an extension of the bottom of the barge. At the open discharge end of the barge the latter is provided with the side wings $g^2$, one of which is shown in detail by Fig. 3 and the positions of which are indicated by Figs. 2 and 4. These side wings are of slatted construction and fastened in any suitable way to the sides of the barge, and these wings prevent the grain from blowing over the sides of the barge and upon the sides of the stack in the operation of discharging the grain upon the latter, said wings serving to confine the grain upon the fingers $g'$ when the barge is tilted.

The towers I I' are united together at their upper ends by a horizontal brace 57, which is extended beyond and connected solidly thereto and to suitable braces 58, that are fastened to the towers below said horizontal brace 57. These towers are also braced by the employment of straining-rods 59, attached to the fixed horizontal floor H; but, if desired, any suitable kind of braces may be used to strengthen the elevated towers.

Within the towers I I' are disposed vertical guide-rails 60. (Shown by Figs. 1, 2, 11, 12, 14, and 15.) These vertical guide-rails are individually arranged in the middle portions of the towers, the lower ends of said guide-rails being firmly secured to the I-beam $I^2$, while the upper ends of said rails are fastened firmly in the upper parts of the towers. Each guide-rail somewhat resembles an ordinary T-rail, and in the sides of said rails 60 are provided the channels 61, the same being more clearly shown by Figs. 11, 12, 14, and 15. The barge is disposed between and close to these vertical rails 60, so as to occupy an eccentric relation thereto, thus making the inner closed end $g$ of the barge somewhat heavier than the open end, which is provided with the slatted extension $g'$ of the bottom and the slatted side wings $g^2$.

On opposite sides of the barge G are provided the vertical guide-plates 62, one of which is secured rigidly to each side of the barge on the outside thereof and said vertical guide-plates being disposed in alinement with each other transversely across the barge or receiver. These vertical guide-plates are provided at their upper ends with guide-rollers 63 64, one guide-roller, 63, being arranged to travel in a channel 61 of the guide-rail 60. The other guide-roller, 64, is mounted in a recess which is provided in the vertical plate 62, so that its axis is at right angles to the roller 63, and this roller 64 is arranged to ride against one face of the guide-rail 60. The lower end of each vertical guide-plate 62 is provided with a segmental offset 65, forming a foot which is disposed in overlapping relation to a segmental guide 66, which is provided on a suspension-plate or carriage 67. Each suspension-plate or carriage 67 of the pair which is employed is provided at its upper end with an eye 68, and this suspension-plate is journaled or recessed at 69 in order to fit partially around the guide-rail 60, as shown by Fig. 15. The suspension-plate or carriage of the pair is equipped with a pair of guide-rollers 70, which are loosely mounted on the suspension-plate or carriage and are arranged in opposing relation, so as to fit in the channels 61 of said plate 60. The two suspension-plates or carriages 67 are mounted on or fitted to the two guide-rails 60 in a manner to slide freely up and down thereon, and these suspension-plates or carriages are not capable of any tilting movement with respect to the rails 60, so that it will be understood that plates are limited to vertical travel on the rail 60. The guide-plates 62, which are fast with the barge on opposite sides thereof, are connected pivotally with the suspension-plates or carriages 67, and this pivotal connection is secured by the employment of bolts 71, one of which passes through the lower end of each vertical plate 62 and through the suspension-plates or carriages 67 adjacent thereto. (See Fig. 15.) It will therefore be understood that the barge having the vertical plates 62 is pivotally connected to the pair of slidable plates or carriages 67 by the bolts 71, and these bolts serve to eccentrically connect the barge to the carriages or suspension-plates 67. The guide-plates 62 move or tilt with the barge when it is turned to the dumping position, (shown in dotted lines in Fig. 2;) but the suspension-plates or carriages 67 remain in their predetermined positions on the guide-rails 60. During the tilting adjustment of the barge and the vertical guide-plates 62 the latter and the rollers 63 64 are adapted to leave the guide-rails 60, the rollers 63 moving away from the channeled faces 61 of the rails, while the rollers 64 move across the other faces of said rails; but when the barge is drawn back to a horizontal position these guide-plates 62 and the rollers 63 64 are moved into positions alongside of the rails 60 and the guides 66 of the suspension-plates or carriages 67. Said tilting movement of the barge, and the vertical plates 62 thereof, is quite limited in order that the feet 65 of the plates 62 will overlap the guides 66 of the carriages, and these guides 66 prevent any lateral displacement of the barge when it is turned on the axis afforded by the pivotal bolts 71. I also equip the carriages 67 with the guide-rollers 72, which are arranged at right angles to the roller 70 and are adapted to ride against one face of the guide-rails 60, and by equipping these carriages with the rollers they are made to travel freely on the rails and are held in slidable engagement therewith at all times.

The eyes 68 at the upper ends of the slidable carriages which support the dumping-barge provide for the attachment of hoisting cables or bands 73 74, one of which is indicated in Fig. 2 as a band, while in Figs. 1 and 5 the parts are shown as cables. These cables extend upwardly from the carriages and within the towers, and they pass over suitable guide-sheaves 75, the positions of which are indicated in Fig. 2, said guide-sheaves being supported near the upper ends of the towers I I'. The cables after passing upwardly and over the sheaves 75 are carried downwardly within the towers and brought together below the horizontal floor H, as shown by Fig. 1, the lower portions of said cables converging to a hoisting-drum 76. This hoisting-drum is mounted loosely on the main axle B, as shown by Fig. 5, and on the drum are reversely coiled the lower ends of the cables 73 74, thus making provision for simultaneously winding or uncoiling the two cables in a manner to raise or lower the barge G with relation to the horizontal floor H and to the guide-rails 60, which are fixed within the towers I I'. The drum 76 is provided with a brake-surface 77, and at one end of this drum is fixed a clutch-section 78, with which is adapted to engage a slidable clutch-section 79, that is keyed to the axle B in a manner to rotate therewith. (See Fig. 5.) The slidable clutch-section 79 is shiftable with a clutch-lever 80, which is fulcrumed at one end, as at 81, on a bar of the main frame A, and against this clutch-lever acts a coiled spring 82, which serves to normally hold the clutch-section 79 in engagement with the clutch-section 78, so as to make the drum 76 fast with the axle B, thereby driving said drum 76 from the axle. The other end of the clutch-lever 80 is pivoted to a link 83, having operative connection with a bell-crank lever 84, that is fulcrumed on the tongue D, and this lever is connected to a rod 85, leading along the tongue and pivoted to a hand-lever 86, which is disposed within convenient reach of the driver. (See Fig. 1.) This hand-lever is associated with a suitable locking device, which is adapted to normally hold the clutch-lever 80 in a retracted position, thus allowing the hoisting-drum 76 to remain idle on the main axle B.

A brake-shoe 87 is arranged to ride against the brake-surface 77 of the hoisting-drum, said shoe being carried by a lever 88, which is mounted on a rock-shaft 89, supported in the frame. This rock-shaft is provided at one end with an arm 90, to which is pivoted one end of a rod 91, the latter being connected with a hand-lever 92, mounted within convenient reach of the driver, thus making provision for adjusting the lever 88 toward and from the drum in order to make the brake-shoe 87 engage with the brake-surface 77 on the drum. This brake mechanism is employed to control the downward movement of the barge after the latter shall have been returned from its inclined dumping position.

The sides of the barge, at the open delivery end thereof, are strengthened by the provision of inclined braces 93, and this barge is provided near the plane of its pivotal connection with the carriages, with adjustable stop devices arranged to limit the tilting movement of the pivoted barge. On each side of the barge, at the upper portion thereof, is firmly secured a stop-plate 94, the latter lying in rear of the vertical guide-rail 60. This stop-plate is provided with a longitudinal slot 95, and on the face of this stop-plate is a series of teeth or serrations 96. A stop 97 is provided with a shank arranged to pass through the slot 95 and to be secured by a bolt 98, which is indicated by dotted lines in Fig. 13, and this stop is provided with a toothed base arranged to have interlocking engagement with the teeth and the slotted plate 94. The stop 97 is thus adjustably fastened to the plate 94 in a manner to move it back and forth in the slot 95 and to vary its position with relation to the guide-rail 60, and said stop 97 is curved, as shown by Fig. 13, in order that it may engage with the headed portion of one guide-rail 60, the latter lying in the path of the stop when it is moved with the barge during its tilting adjustment. When the barge is tilted to the dotted-line position of Fig. 2, the stops 97 move with the barge toward the rails 60, and these stops engage with said rails to limit the tiltable movement of the receiver. The stop may be adjusted in the slotted plates to regulate the tilting adjustment of the barge.

I will now proceed to describe the elevator mechanism employed for the purpose of carrying the harvested grain from the platform E up to a point above the receiver or barge G. This elevator mechanism is disposed at one side of the machine in an upright position, and it is indicated in its entirety at J in Figs. 1, 2, 6, 7, and 8 of the drawings. This elevator has its active parts disposed within an upright casing which is preferably of metallic construction, and said casing is mounted or supported at one end on the horizontal platform E, thus disposing the lower part of the elevator mechanism in operative relation with the delivery end of the platform-conveyer. The casing $j$ is provided with suitable floors or partitions $j'$ $j^2$, which are indicated in Fig. 6, and against these floors or partitions operate the endless elevators $J'$ $J^2$, each consisting of a suitable number of chains which carry a series of toothed slats. The endless elevator $J^2$ is guided or directed by a series of idler-sprockets 98, and the chains of this elevator are driven by engagement with sprocket-wheels 99 on a horizontal shaft 100, the latter being supported above the mouth through which the grain is delivered to the lower end of the casing J. This shaft 100 is provided with a gear-pinion 101, arranged outside of the casing and having intermeshing engagement with a spur-gear 102 on a countershaft 103, and on this countershaft is a driving-sprocket 104, that is engaged by a short upright endless chain 105. Said chain is adapted to be held in a taut condition by a tightening-roller 106, mounted on a regulating-plate 107, which is fastened to the casing $j$. (See Fig. 6.) The chain 105 engages with a sprocket 108, fastened to one end of a horizontal shaft 109, and this shaft is provided with a sprocket-gear 110, that is disposed in alinement with a sprocket-gear $51^a$ on the shaft 48, said sprocket-gears 110 and $51^a$ being connected by an endless short chain 111, thus making provision for driving the shaft 48 from the shaft 109, and this shaft in turn drives the shaft 103, which is geared to the shaft 100, to propel the elevator $J^2$. The other endless elevator, $J'$, is guided by the idler-sprockets 112, mounted in a suitable way on the casing $j$, and this elevator $J'$ has its endless chains fitted around sprocket-gears 113, which are secured on the shaft 109, thus making said last-mentioned shaft drive the elevator $J'$ directly and at the same time transmitting motion through the chain 105 to drive the elevator J². The elevators J' and J² are guided by their sprockets 98 and 112 in a way to widen or separate said elevators at the lower end of the casing, so as to allow the free entrance of the grain to the elevator mechanism no matter whether the grain is fed in a loose condition or in bunches. The chains of the elevator J' are engaged by idler-sprockets 114 at the upper end of the elevator-casing, and with certain of these sprockets 114 is engaged a suitable tightening device 115. (See Fig. 6.) The chains of the other elevator, J², engage with sprocket-wheels on a shaft 116, mounted in the elevator-casing, and on this shaft is secured a sprocket-gear 117, with which engages a sprocket-chain 118, the latter serving to drive a sprocket-gear 119 on a horizontal shaft 120. The endless elevators J' J² are arranged in the casing $j$, so as to have coöperative relation with each other and mutually contributing to the work of carrying the grain from the platform to a point above the barge or receiver, and these elevators discharge the grain at their upper portions to a horizontal upper conveyer, (indicated in its entirety at K.) This horizontal conveyer has a suitable frame $k$, which is hung or pivoted on the shaft 120, and within said conveyer-frame is disposed a slatted carrier consisting of endless chains, which are fitted on suitable sprockets carried by the shaft 120, said carrier-chains being fitted to sprockets 121 on a shaft 122, journaled at the inner free end of the conveyer-frame $k$. A suitable tightening device 123 is associated with the shaft 122 to keep the chain of the horizontal upper conveyer in a taut condition. It will be understood that this horizontal conveyer K extends from the elevator J to a point well over the barge or receiver G and that this conveyer is pivotally supported at one end by the shaft 120 on said elevator. The inner end of this conveyer K is suspended over the barge by a cable 124, which is fastened by a clevis 125 to the conveyer-frame $k$. This cable passes over a guide-sheave 126, which is suspended from the outer end of an arm 127, attached to one of the towers, and this arm is strengthened by the brace 59ª, which serves to also stay one tower. The cable 124 leads in a downward direction from the pulley 126, and this cable is within convenient reach of one of the attendants, so that it may be fastened in any suitable way to a part of the machine-frame.

The conveyer K is adapted to assume a position across the end portion of the barge or receiver G, as shown by Fig. 4, and in order to deliver the grain in the middle of the barge I employ a chute L. This chute is preferably of the slatted construction, (shown more clearly by Figs. 2 and 4,) and said chute is attached to and supported on the inner suspended end of the conveyer K. The chute is arranged to extend in an inclined direction and at right angles to the conveyer, and the grain is delivered by the conveyer onto the chute, which in turn directs it into the middle portion of the barge or receiver.

The barge or receiver G is equipped at its closed rear end with a standing platform 128, which is fastened in any suitable way to the barge and is strengthened by a stay 129. (See Fig. 2.) This platform accommodates one of the attendants whose duty is to distribute the grain in the barge when delivered by the elevator and the upper conveyer. When the barge or receiver is raised to the desired height, it may be tilted by the chain 130, which is attached to the open light end of said barge, and after the barge shall have been tilted it is adapted to return to a horizontal position, because the closed end $g$ thereof is heavier than the open discharging end. The chains 130 extend from the barge to suitable receptacles 131, and said chains may be secured at any desired point, so as to tilt the barge at the proper height and to drop and fold within said receptacles 131, which are supported on the horizontal floor H when the barge is lowered. (See Fig. 1.)

I prefer to provide a gate at the open discharging end of the barge adapted to retain the grain therein during the process of loading said receiver, and in this embodiment of the invention the gate consists of a series of vertical slats 132, which are secured at their lower ends to a supporting-bar 133, that is attached in a suitable way to the elevated floor H. The slats of this gate extend between the fingers $g'$ at the delivery end of the barge. When the barge is elevated, the slats 132 remain attached to the platform, and the grain can slide out of the barge when the latter is tilted; but when the barge is lowered the slats 132 pass between the fingers, so that the gate again closes the barge against the escape of the grain.

The pole D is provided at its rear end with a fixture 134, adapted to receive a part of a draft appliance, (indicated at M in Fig. 1.)

N designates a frame supported on one of the towers and held in position by a stay $n$. This frame is adapted to support an awning over the driver occupying the platform 13 and the horses, so as to protect them from the hot rays of the sun. If desired, the awning may be folded into compact relation to the machine.

The operation may be described briefly as follows: The machine is propelled across the field by the team, and the cutter apparatus is presented to the grain at the proper elevation, so as to sever the heads of the grain, the reel F sweeping the grain over the cutter apparatus and upon the platform E. The platform-conveyer transports the grain to the elevator J, which in turn delivers it to the conveyer K, by which the grain is discharged into the barge. The grain is distributed by a man stationed therein or on the platform 128, and this barge rests firmly on the elevated floor H. After the barge shall have been loaded the operator throws the cutter apparatus and the several conveyer mechanisms out of service by manipulating the proper levers, and the machine is driven from the field to the stack. The upper conveyer K is raised out of the way of the barge, and the clutch 79 is manipulated to make the drum 76 fast with the axle B. As the machine travels toward the stack the drum is rotated in order to coil the cables 73 74 thereon, and the barge is thus raised, because the cables will elevate the slidable carriages 67, to which the barge is pivoted. During the elevation of the barge it remains in a horizontal position; but when the machine reaches the stack it is driven so that the delivery end of the fingers $g'$ overhang said stack, after which the barge is raised sufficiently for the chains 130 to pull and tilt the barge to its dumping position, whereby the grain is discharged directly upon the central portion of the stack. After discharging the grain the barge is returned by gravity to its horizontal position, and the brake 87 is engaged with the drum, so as to control the lowering of the barge due to the uncoiling of the cables 73 74 from the drum 76. The machine may now be driven to the field, and the operation of harvesting the grain and loading it into the barge may be resumed.

It is evident that the barge can be tilted at any height by properly lengthening or shortening the chains 130 and fastening the latter, so as to dump the barge when it is raised. The barge will remain in a horizontal position during the elevation thereof and until the chains 130 begin to pull the lighter open end of the barge, while the closed end will continue to ascend, thus tilting the barge and making the stop 97 engage the track 60. As the stack increases in height the chains may be lengthened to allow the barge to ascend higher before it is tilted by the chains, and by this means the barge may be raised higher and higher until it reaches the highest position on the towers. It is necessary to make the closed end of the barge heavier than the open end, so that it will always return the barge when unloaded back to horizontal position without assistance.

The tower I is connected by a brace $i^3$ to the pole D. (See Figs. 1 and 4.) Suitable tightening devices for the chains and shafts may be provided wherever required—as, for example, at $106^a$ for the chain 111 in Fig. 6, at the shaft 116 the chain 118, and on the platform chains 52.

One of the essential features of my invention resides in a grain barge or receptacle capable of a rising-and-falling motion with respect to the harvesting mechanism and the general framework of the portable machine. This rising and falling barge during the operation of the harvesting mechanism occupies a stationary lowered position on the framework in order that the grain may be conveyed from the cutter apparatus to the barge, in which the grain is allowed to accumulate until the barge is loaded. The cutter apparatus and the conveying devices remain in service during the period that the grain is cut in the field and the barge is being loaded, the hoisting apparatus remaining idle; but when the machine is moved from the field of cutting operations the cutter apparatus and the conveying devices are thrown out of gear. As the machine carrying the loaded barge approaches the stack the hoisting apparatus is thrown into gear with the driving-shaft, and the barge is bodily hoisted to an elevated position preparatory to dumping the load from such elevated position directly upon the top of a stack. In the preferred embodiment of my invention the dumpable barge, with its pivotal supports, is bodily hoisted in a way to effect the automatic tilting of the barge when it reaches a predetermined point in its elevation, whereby the loaded barge is raised and then dumped in order to discharge the load without the intervention of manual labor.

Having thus described my invention, I claim as new and desire to secure by Letters Patent—

1. A combined harvester and stacker comprising a wheeled frame, a cutting apparatus thereon, a grain-barge carried by the frame and capable of a rising-and-falling movement thereon, means for transferring harvested grain from the cutter apparatus to said barge, and means for bodily hoisting the barge.

2. A combined header and stacker having a suitable cutter apparatus, a vertically-movable barge disposed in an elevated position, grain-carrying devices between the cutter apparatus and said barge, and means for bodily hoisting said barge.

3. A combined header and stacker having a suitable cutter apparatus, a barge normally occupying a raised position in a plane above the cutter apparatus, grain-carrying devices between said cutter apparatus and the barge, and power-driven devices for hoisting said barge bodily by the movement of the machine.

4. A combined harvester and stacker having a cutter apparatus, a grain-barge capable of an up-and-down movement relative to said cutter apparatus, tiltable supports for said barge, means for loading said barge with grain harvested by the cutter apparatus, a hoisting mechanism for bodily raising the barge and its tiltable supports to an elevated position, and means for tilting said barge to a dumping position when elevated by said hoisting mechanism.

5. A combined header and stacker, comprising a wheeled frame carrying a cutter apparatus, an elevated platform supported on said frame in a horizontal plane above the cutter apparatus, a barge or receiver arranged when lowered to rest on said platform, grain-carrying devices between the cutter apparatus and said barge, and means for bodily hoisting and dumping the barge.

6. A combined header and stacker, comprising a wheeled frame carrying a cutter apparatus, vertical guides extending upwardly from said frame, a barge slidably fitted to said guides, grain-carrying devices between the barge and the cutter apparatus, and means for bodily lifting said barge when loaded.

7. A combined header and stacker, comprising a wheeled frame having a cutter apparatus, an elevated platform above said cutter apparatus, vertical guides rising above said platform, a barge slidably fitted to said guides and arranged to rest on said platform, means for bodily raising said barge when loaded, and grain-carrying devices between the cutter apparatus and the barge.

8. In a combined header and stacker, the combination with a cutter apparatus, of a vertically-movable barge, normally occupying an elevated position with respect to said cutter apparatus, an elevator arranged to receive the grain from said cutter apparatus, and a conveyer for transferring grain from the elevator to the barge, said conveyer being shiftable out of the path of the barge.

9. A combined harvester and stacker having a wheeled frame, a cutter apparatus thereon, an up-and-down-movable grain-barge mounted on said frame and adapted when lowered to lie above said cutter apparatus, means for bodily hoisting said barge, a platform-conveyer adjacent to said cutter apparatus, an upstanding elevator arranged to receive its load from said platform-conveyer, another conveyer between the elevator and the barge, a drive-shaft, and independent trains of driving connections for collectively operating the cutter apparatus, the elevator, and the conveyer devices independently of the barge-hoisting mechanism.

10. In a combined header and stacker, the combination with a suitable cutter apparatus, and means for carrying grain therefrom, of vertical guides, a barge slidably fitted to said guides, means for bodily raising the barge, and a conveyer disposed in overhanging relation to the barge and shiftable out of path thereof.

11. In a combined header and stacker, the combination with a wheeled frame, and a cutter apparatus, of vertical guides extending above said frame, wheeled carriages slidably fitted to said vertical guides, a receptacle pivotally supported on said carriages, conveyer devices for transferring harvested grain from the cutter apparatus to the receptacle when the latter is lowered, means for bodily hoisting the receptacle and the carriages, and means for moving said receptacle when hoisted to a dumping position.

12. In a combined header and stacker, the combination with a wheeled frame, a cutter apparatus, and suitable grain-carriers, of vertical guides extending above said frame, a barge having pivotal and slidable connection with said guides, means for bodily hoisting said barge, when loaded by the grain-carriers, to an elevated position, and means for tilting said barge when in said elevated position and discharging its load upon a stack.

13. A combined harvester and stacker having a wheeled frame, a drive-shaft, a cutter apparatus on said frame, an up-and-down-movable grain-barge carried by the frame, a hoisting mechanism for bodily raising the barge, and means whereby the cutter apparatus and the barge-hoisting mechanism may be driven from the drive-shaft independently of each other.

14. A combined harvester and stacker having a wheeled frame, a drive-shaft, a cutter apparatus on said frame, an up-and-down-movable grain-barge carried by said frame, a hoisting mechanism for bodily raising said barge, a conveyer mechanism between the cutter apparatus and the barge, driving connections for operating the cutter apparatus and the conveyer mechanism collectively from the drive-shaft, and other driving connections for operating the barge-hoisting mechanism from the drive-shaft independently of the cutter apparatus and the conveying mechanism.

15. A combined header and stacker comprising a wheeled frame carrying a cutter apparatus, an elevated platform fixed to said frame and disposed above the cutter apparatus, towers rising from the elevated platform and provided with guide-rails, carriages slidably fitted to said rails, a barge mounted on said carriages, means driven by the wheeled axle and connected with said carriages to bodily raise the barge, and conveyer devices between the cutter apparatus and the barge.

16. In a combined header and stacker, the combination of a wheeled frame carrying a cutter apparatus, an elevated barge, a hoisting mechanism for bodily raising said barge, a conveyer in rear of the cutter apparatus, an elevator arranged to receive its load from said conveyer, an upper conveyer having pivotal connection with said elevator and arranged to overhang the barge, and means for raising said upper conveyer out of the path of the barge.

17. In a combined header and stacker, the combination of a tiltable barge, means for bodily hoisting the barge, a cutter apparatus, an elevator, a horizontal upper conveyer arranged to receive its load from the elevator and disposed in overhanging relation to the barge, and a chute carried by the free end of the upper conveyer and extending over the barge to deliver the load centrally thereto.

18. In a combined header and stacker, the combination of a wheeled axle, a cutter apparatus, a vertically-movable barge, means for transferring grain from the cutter apparatus to the barge, a drum fast with said wheeled axle, cables coiled on the drum and connected with said barge to bodily hoist the latter, means for locking the drum on the elevation of the barge, and means for tilting the barge when raised.

19. A combined harvester and stacker having a wheeled frame, upright barge-guides on said frame, an up-and-down-movable grain-barge limited to slidable movement by said guides, a hoisting mechanism for bodily raising said barge, a cutter apparatus, a conveyer mechanism between the cutter apparatus and the barge, and means for operating said parts in due order.

20. In a combined grain header and stacker, the combination of a cutter apparatus, a main axle, an intermediate shaft 109 connected with said cutter apparatus, a horizontal conveyer in rear of the cutter apparatus and driven by said intermediate shaft, an elevator having two endless conveyers arranged to receive a load from the horizontal conveyer, means driven by the shaft 109 for driving both conveyers of the elevator, a vertically-movable barge, means for bodily hoisting said barge, and an upper conveyer overhanging the barge and driven by one of the elevator-conveyers.

21. A combined harvester and stacker having a wheeled frame, upright barge-guides on said frame, tiltable supports slidably confined by said guides, a grain-barge carried by said supports, a hoisting mechanism for bodily raising the barge and its supports, a cutter apparatus on said frame, and means for transferring harvested grain from said cutter apparatus to said barge.

22. A combined harvester and stacker having a wheeled frame, a drive-shaft, a cutter apparatus on said frame, an up-and-down-movable grain-barge carried by said frame, means for driving the cutter apparatus from the drive-shaft while the machine is operating in the field of grain to be harvested, a hoisting mechanism for said barge, and independent driving connections between the drive-shaft and the barge-hoisting mechanism for bodily hoisting the barge to an elevated position on the frame during the period of transit of the machine from the field of cutting operations to the place of deposit of the load in the barge.

23. A combined harvester and stacker comprising a wheeled frame, a cutting apparatus thereon, an up-and-down-movable grain-barge, means for supporting the barge in its lowered position on the frame, a hoisting mechanism for bodily raising the barge from the supporting means and to a discharging position, and means for transporting grain from the cutter apparatus to the barge when the latter is in its lowered position.

24. A combined harvester and stacker, comprising a wheeled frame carrying a cutter apparatus, an up-and-down-movable barge, means for restraining the barge from swaying during the periods of such up-and-down movement, a hoisting mechanism for bodily raising the barge, and means for transferring grain from the cutter apparatus to the barge when the latter is lowered.

25. The combination with a wheeled frame, a drive-shaft, and a cutter apparatus, of an up-and-down-movable barge carried by the cutter apparatus, a hoisting mechanism for bodily raising the barge to a discharging position, means for guiding the barge when operated by the hoisting mechanism, means for transferring grain from the cutter apparatus to the barge when the latter is lowered, and means adapted to be actuated by the drive-shaft and controllable at will for operating either the hoisting mechanism or the cutter apparatus and grain-carrier.

In testimony whereof I have signed my name to this specification in the presence of two subscribing witnesses.

JOHN H. KINDSVATER.

Witnesses:
   WILL A. TURNER,
   LOUIS WABNITZ.